United States Patent [19]

Street

[11] Patent Number: 4,757,350
[45] Date of Patent: Jul. 12, 1988

[54] STEREOSCOPIC RECORDING METHOD AND APPARATUS, AND PRODUCTION METHOD AND APPARATUS

[76] Inventor: Graham S. B. Street, Impstone House, Pamber Road, Silchester, Reading, Berkshire, United Kingdom, RG7 2NU

[21] Appl. No.: 27,193

[22] Filed: Mar. 17, 1987

Related U.S. Application Data

[62] Division of Ser. No. 732,043, filed as PCT GB84/00332, Oct. 3, 1983, published as WO85/01593, Apr. 11, 1985, Pat. No. 4,668,063.

[30] Foreign Application Priority Data

Oct. 3, 1983 [GB] United Kingdom ................ 8326387

[51] Int. Cl.[4] ...................... G03B 35/00; G03B 27/32
[52] U.S. Cl. ...................... 355/22; 354/112; 350/167; 430/946
[58] Field of Search ...................... 354/112, 115, 110; 355/22; 353/7; 350/130, 131, 167, 3.76; 430/946, 495

[56] References Cited

U.S. PATENT DOCUMENTS

| | | | |
|---|---|---|---|
| 2,562,077 | 7/1951 | Winnek | 355/22 |
| 2,829,051 | 4/1958 | Gretener et al. | 430/946 |
| 2,833,176 | 5/1958 | Ossoinak | 354/115 |
| 3,076,395 | 2/1963 | Cuvier | 350/131 |
| 3,099,195 | 7/1963 | Goodbar | 350/167 |
| 3,409,351 | 11/1968 | Winnek | 353/7 |
| 3,520,588 | 7/1970 | Salyer et al. | 430/946 |
| 3,608,993 | 9/1971 | Bitetto | 354/110 |
| 3,683,773 | 8/1972 | Dudley | 354/112 |
| 3,724,924 | 4/1973 | Lenfant et al. | 350/167 |
| 3,751,258 | 8/1973 | Howe et al. | 430/946 |
| 3,759,155 | 9/1973 | Bestenreiner et al. | 354/102 |
| 4,130,337 | 12/1978 | Okoshi | 350/3.76 |
| 4,552,442 | 11/1985 | Street | 354/112 |

FOREIGN PATENT DOCUMENTS 2143138 2/1973 France.

Primary Examiner—A. A. Mathews
Attorney, Agent, or Firm—Birch, Stewart, Kolasch & Birch

[57] ABSTRACT

Apparatus for producing a record of an object field in which substantially perspective change in one direction only is recorded. The apparatus comprises elongate aperture means (35) and an array of lens elements (34) which extends in two dimensions and is disposed in an image field. Each lens element (34) is convergent in all planes orthogonal to the array. Recording means are so arranged that each lens element (34) forms an image thereon. Each recorded image (36) is derived from rays from a range of perspectives of the object field in one direction and a substantially smaller range in an orthogonal direction and each recorded image (36) is distinct from each other recorded image. Reproduction apparatus allows an autostereoscopic image to be formed on conventional lenticular material from an intermediate record produced by the recording apparatus.

20 Claims, 11 Drawing Sheets

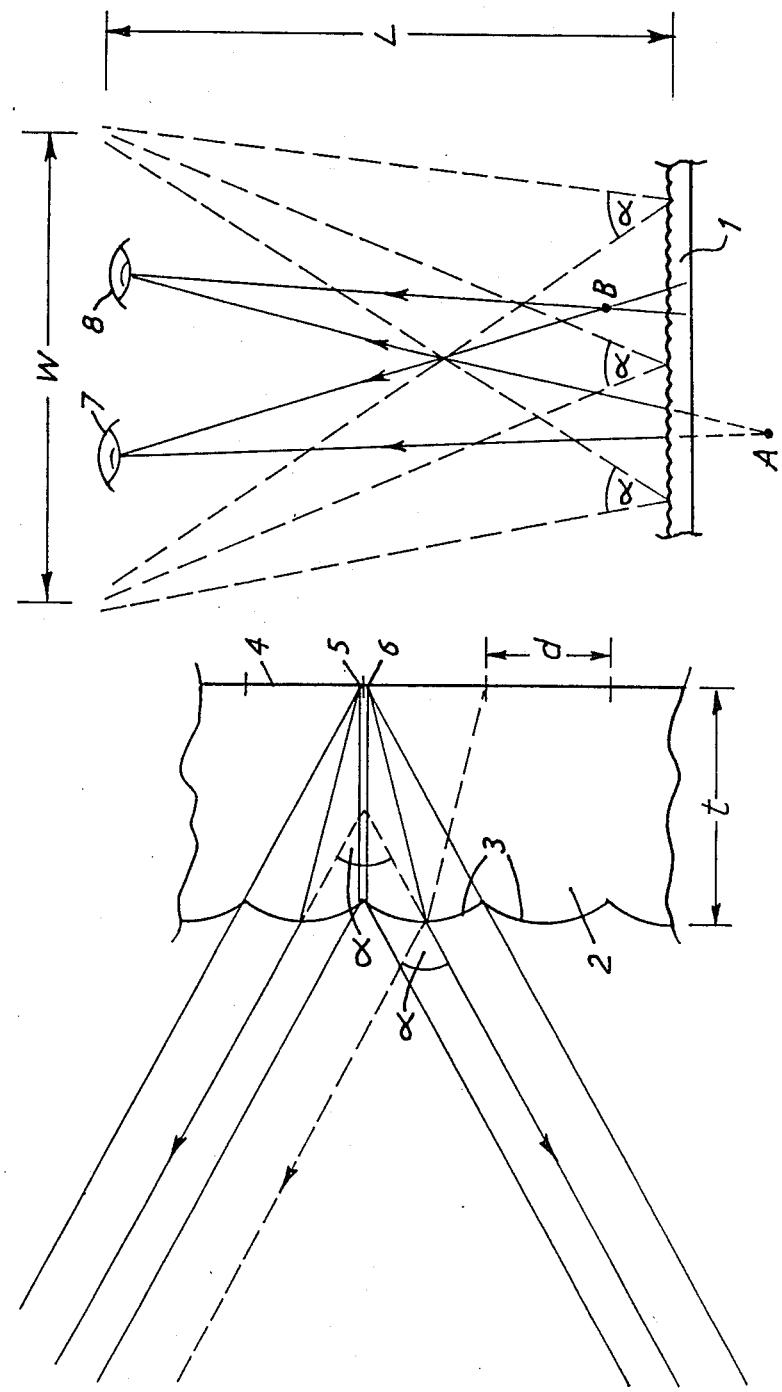

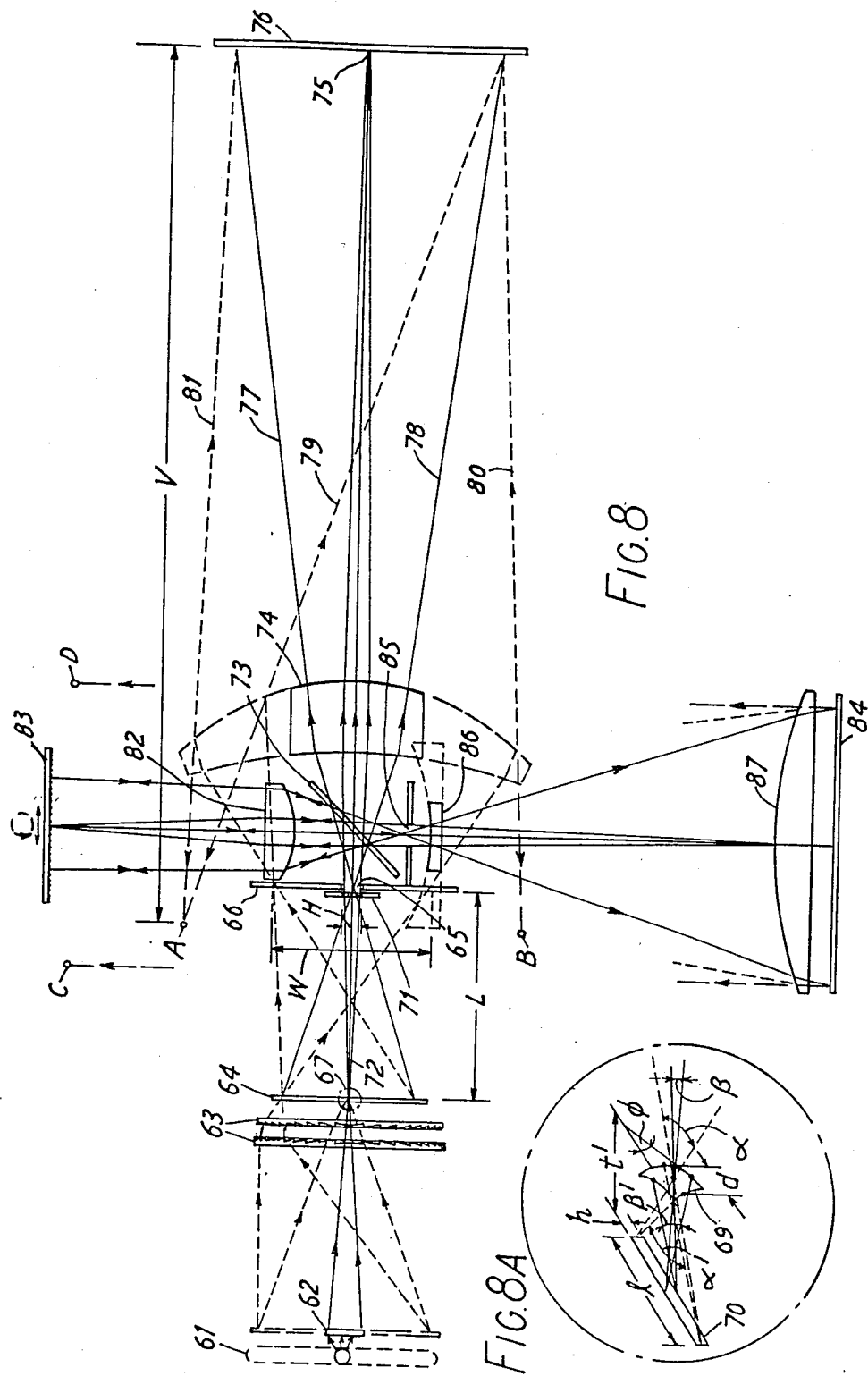

STEREOSCOPIC RECORDING METHOD AND APPARATUS, AND PRODUCTION METHOD AND APPARATUS

This application is a division of application Ser. No. 732,043 filed as PCT GB84/00332, Oct. 3, 1983, published as WO85/01593, Apr. 11, 1985 now U.S. Pat. No. 4,668,063.

This invention relates to recording methods and apparatus for producing records of object fields, and also to production methods and apparatus for producing autostereoscopic images from intermediate records.

The use of a lenticular screen in conjunction with film emulsion positioned at the focal plane of the lens elements (lenticules) of such a screen, in order to compose and subsequently view a three dimensional image, is well known. In some methods separate two dimensional views of different perspectives of an object field are taken and then subsequently recombined through a lenticular screen to form the composite, so called, autostereoscopic image.

The fundamental property of an autostereoscopic image is that each eye views a different perspective of the object field by viewing the picture at a slightly different angle, and that the observer does not require special viewing devices to do so.

In broad terms there are two types of lenticular picture.

A first type of picture is formed on cylindrically lenticulated material having a large number of long narrow cylindrical lens elements or lenticules which are parallel-arranged. Each lens element is primarily convergent in planes both orthogonal to a plane containing the elements and orthogonal to the axis of the element. The element is less convergent in all other planes and in particular has no or substantially no convergence in planes containing the axis of the element. A portion of a specific perspective is recorded as a narrow stripe viewed from a specific series of vantage points as filling the lenticule. This type of lenticular picture only accommodates changes of perspective in one direction, allowing the viewer to change position in, for instance, the vertical direction without changes in perspective being observed.

The second type of lenticular picture is formed on lenticulated material having a two dimensional array of lens elements or lenticules, each of which is convergent in all planes orthogonal to a plane containing the elements. The elements may be formed as small spheroidal regions of the surface of the lenticulated material or by placing two cylindrically lenticulated surfaces in close proximity with the axes of one set of cylinders orthogonal to that of the second set. Each lenticule or lenslet operates symmetrically in two dimensions allowing changes of perspective in both the horizontal and vertical to be accomodated. Within the limits of the resolution of the emulsion at the focal plane of each lenticule and the latter's optical aberrations, each point of the emusion behind a specific lenticule is seen to fill this lenticule when viewed from a particular vantage point.

For more detail on various proposals which might be employed to produce lenticular autostereoscopic pictures, descriptions may be found amongst the patent literature. UK Pat. No. 1,528,362 (Dimensional Development Corporation) describes a process of taking a number of different two dimensional perspectives of an object field and subsequently combining these into one lenticular picture, in which the emulsion behind each cylindrical lenticule is filled unambiguously with the appropriate image content.

U.S. Pat. No. 2,562,077 (Winnek) proposes the use of large diameter lenses in conjunction with a wide rectangular aperture in which a range of perspectives may be photographed in a single operation. Again cylindrical lenticules are shown and the space behind each lenticule is filled unambiguously by properly setting the width of the aperture in relation to the width of lenticules, the thickness of the lenticular material and the distance of the aperture from the film.

The use of spherically lenticulated film for recording autostereoscopic pictures with perspective changes in both horizontal and vertical directions is described in U.S. Pat. No. 3,683,773 (Dudley). Close packed hexagonal or square lenslets could be used in conjunction with an aperture of similar shape, the dimensions of such aperture being so chosen that the image of this formed by each lenticule on the film emulsion precisely abuts those formed by its nearest neighbours. In effect, the width of the image associated with each lens element is limited to that of the lens element itself.

According to the present invention there is provided recording apparatus for producing a record of an object field in which substantially perspective change in one direction only is recorded, said apparatus comprising elongate aperture means, an array of lens elements extending in two dimensions and disposed in an image field, each lens element being convergent in all planes orthogonal to said array, and recording means associated with the lens elements, such that, in use, each lens element of the array forms an image on said recording means, each recorded image being derived from rays from a range of perspectives of the object field in one direction and a substantially smaller range in an orthogonal direction, and each recorded image being distinct from each other recorded image.

This invention involves a departure from the conventional practice of using cylindrically lenticulated film for autostereoscopic pictures accommodating perspective changes in only one direction and spherically lenticulated film for pictures which accommodate changes in both the vertical and horizontal. Embodiments of the invention provide a number of significant advantages over prior art methods.

For example, recording apparatus according to the invention can provide an intermediate stereoscopic record for subsequent enlargement and for reproduction onto conventional cylindrical lenticular material, in which substantially greater number of perspectives of the object field may be recorded unambiguously than would normally be achievable for the chosen lenticule width and the resolving power of the emulsion used in the intermediate record. Consequently faster emulsions (coarser grain size) may be used to provide a shorter exposure time in the initial picture taking process.

Another embodiment of the invention allows a three-dimensional colour picture to be recorded whilst employing black and white emulsion. Suitable apparatus will allow this record to be used to produce a full colour autostereoscopic picture on cylindrical lenticular film.

In certain embodiments, a number of different images of different object fields, each comprising a range of perspectives of the respective object field in one direction only, may be unambiguously recorded on a single intermediate record. Each such image is independent of the other images, the record can act as a "cassette" from which individual images may be retrieved for subsequent reproduction. Instead of recording images of distinct object fields, images could be recorded as a time series of images of the same object field, providing a degree of animation to the subject matter.

It is possible to employ an elongate aperture means which has a ratio of length to width (ie. an aspect ratio) as low as 5 to 1, provided there is no call for recording a particularly large number of perspectives within one image or a large number of different images on a single intermediate record. Suitably, however, the elongate aperture means has an aspect ratio which exceeds 10 to 1, and preferably the elongate aperture means is such that each recorded image has substantially no perspective change in the orthogonal direction.

According to the present invention is also provided reproduction apparatus for the production of an autostereoscopic image of an object field in which perspective change substantially in one direction only is reproduced, said image being produced from an intermediate record, said record comprising an array of lens elements extending in two dimensions, each lens element being convergent in all planes orthogonal to said array, and an array of images recorded on associated intermediate recording means, each recorded image being associated with a respective one of said lens elements, wherein the reproduction apparatus comprises, means for mounting said intermediate record, a light source arranged to provide substantially uniform illumination of at least a portion of said intermediate record, elongate selection aperture means arranged to transmit only rays from said light source each of which has traversed a recorded image and its associated lens element, and imaging means arranged to form an autostereoscopic image from said transmitted rays in which perspective change substantially in one direction only is reproduced.

According to the invention there is also provided a method for producing a record of an object field in which substantially perspective change in one direction only is recorded, the method comprising providing elongate aperture means so as to permit passage of rays travelling from the object field through the aperture means towards a two dimensional array of lens elements with associated recording means, each lens element being convergent in all planes orthogonal to said array, and recording an array of images of the object field on the recording means, each image being distinct from each other recorded image and being derived from rays from a range of perspectives of the object field in one direction and a substantially smaller range in an orthogonal direction.

According to the invention there is also provided a reproduction method for the production of an autostereoscopic image of an object field in which perspective change substantially in one direction only is reproduced, said image being produced from an intermediate record, said record comprising an array of lens elements extending in two dimensions, each lens element being convergent in all planes orthogonal to said array, and an array of images recorded on associated intermediate recording means, each recorded image being associated with a respective one of said lens elements, the reproduction method comprising, substantially uniformly illuminating at least a portion of said intermediate record, arranging elongate selection aperture means to transmit only rays each of which has traversed a recorded image and its associated lens element and forming an image from said transmitted rays in which perspective change substantially in one direction only is reproduced.

The invention will now be described by way of example with reference to the accompanying drawings, in which:

FIGS. 1A and 1B illustrate the principles of an autostereoscopic picture employing a lenticular screen.

Figure 6A:
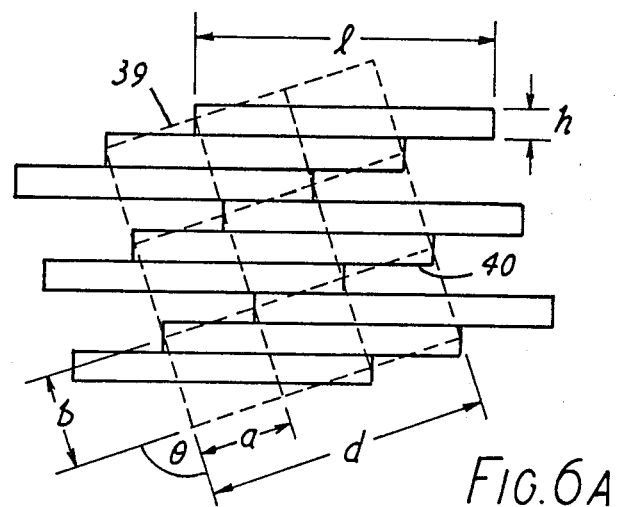
Figure 6B:
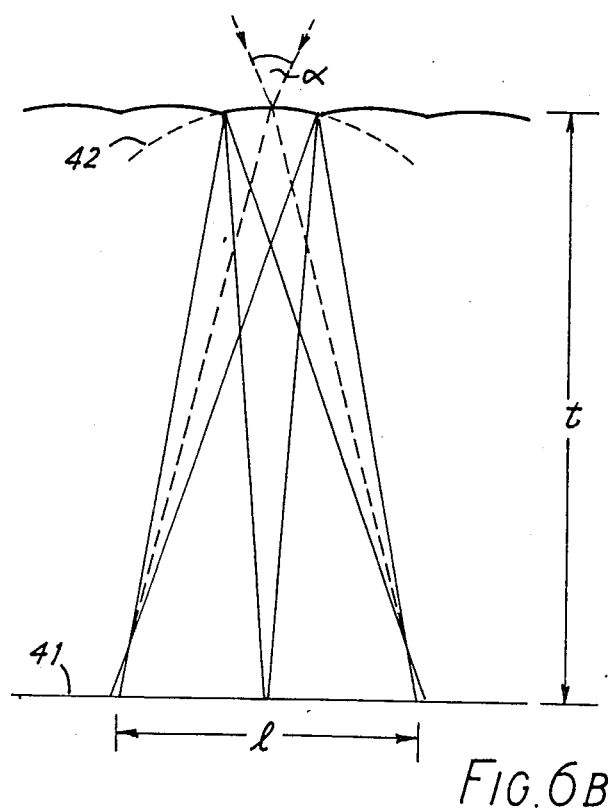
Figure 6C:
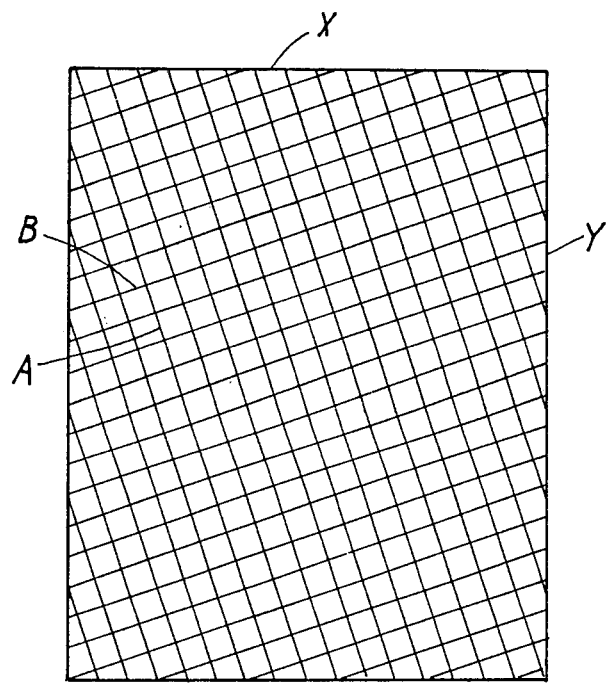

FIGS. 6A and 6B are a plan and section side elevation respectively of a small region of spherical lenticular film showing how such film may be utilised in accordance with a second embodiment of the invention to achieve significant angles of acceptance (viewing angle) in one direction whilst reducing aberrations for skew rays and increasing picture resolution generally and FIG. 6C is a plan view of a sheet of such film.

FIGS. 7, 7A, 7B and 7C schematic diagrams of an embodiment of the invention in which colour information is recorded on lenticular material carrying black and white emulsion.

FIGS. 8 and 8A are sectional view of apparatus according to an embodiment of a second aspect of the invention for reproducing an autostereoscopic image from a lenticular record produced using embodiments according to the first aspect of the invention.

Figure 9:
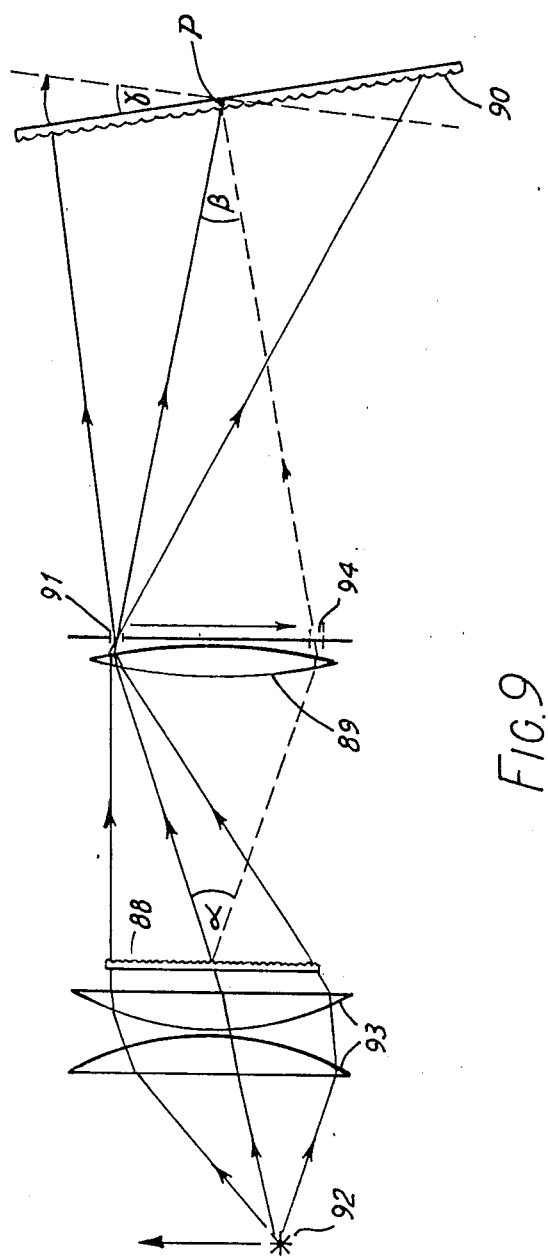
Figure 10:
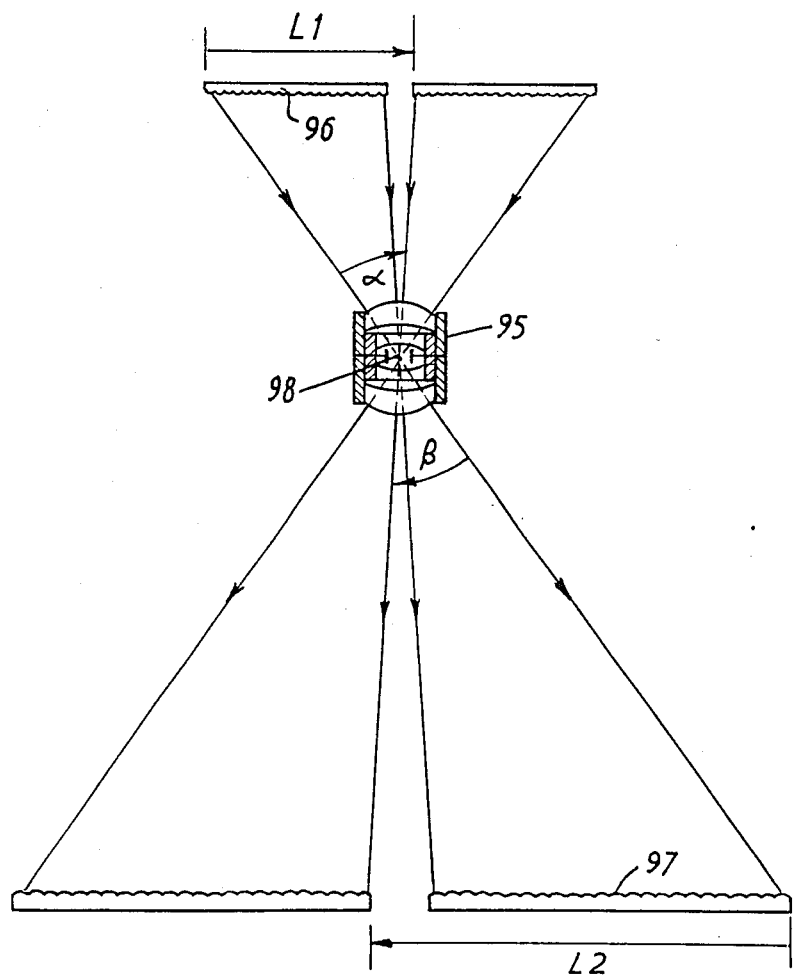

FIGS. 9 and 10 are sections of further reproduction apparatus according to the invention.

The principle of the formation of an autostereoscopic image on both cylindrical and spherical lenticular film composed of a lenticular screen in front of a photographic emulsion is illustrated with reference to FIGS. 1A and B.

A small part of lenticular picture 1 (FIG. 1B) is shown enlarged in FIG. 1A to consist of a regular array of small lenses (lenticules) 3 in front of an image surface 4. Any point on this surface will, to a good approximation, fill the entire width of the associated lenticule when viewed from a particular direction. The amount of image bearing surface 4 associated with each lenticule is typically equal in width d to that of the lenticule itself. The range of angles over which a lenticule may be observed without viewing a portion of the surface 4 associated with its nearest neighbour is known as the viewing angle of the lenticular picture. Points 5 and 6 represent the limiting points for two adjacent lenticules and, to a good approximation, for a thickness t of lenticular material of refractive index $\mu$, the following relationship will hold $$\text{arc sin}\left[\frac{\sin(\alpha/2)}{\mu}\right] = \text{arc tan}\left(\frac{d}{2t}\right)$$

In a direction which is orthogonal to the longitudinal axis of a cylindrical lenticule (or in any direction in the case of spheroidal lenticules) the lenticular picture is limited in detail to the lenticule pitch, equal to d in the illustration.

It is normal to arrange for the direction of the centre of the viewing angle α to vary as a function of position so that, at an optimum viewing distance L, there is a region of width W=2L tan (α/2) from which the entire picture may be unambiguously viewed. The right eye 7 and the left eye 8 of the observer see point B in front of the picture 1 and point A as appearing to lie behind the surface. This is because the various rays which are reconstructed by the lenticular picture to correspond to point B emanate from different lenticules (dependent on ray direction). The same is true for point A except that the rate of change of ray direction as a function of position on the lenticular picture is of opposite sign to that of B. The slower the rate change, the nearer a point is to the picture surface, and, the faster this rate of change, the further behind or in front. It will be clear that, the more precisely a pencil of rays is focussed on the emulsion behind a lenticule and the higher the resolution of the emulsion, the more precisely the pencil of rays will be reconstructed when viewed, and thus the greater the depth of field.

In practice, it is a combination of the optical aberrations of a lenticule and the resolving power of the emulsion at its optimum focus which, for a given lenticule width and viewing angle, limits the precision of the reconstruction process. This, in turn, limits the shift of origin at the lenticular screen as a function of the observer's position of rays seen to correspond to a particular point in the image field before the image becomes degraded.

In fact, for a viewing angle α of 25°, and a refractive index of approximately 1.5, a shift of about forty lenticule widths may be accommodated, given emulsion of sufficient resolution. For a viewing angle of 40°, however, this shift is reduced to twelve widths before a degraded image is observed. Thus, for a large viewing angle, a smaller number of different perspectives can be accommodated on a lenticular screen than for a smaller viewing angle.

Two types of conventional lenticular film and the aperture dimensions of associated cameras are illustrated with reference to FIGS. 2A and 2B.

Figure 2A:
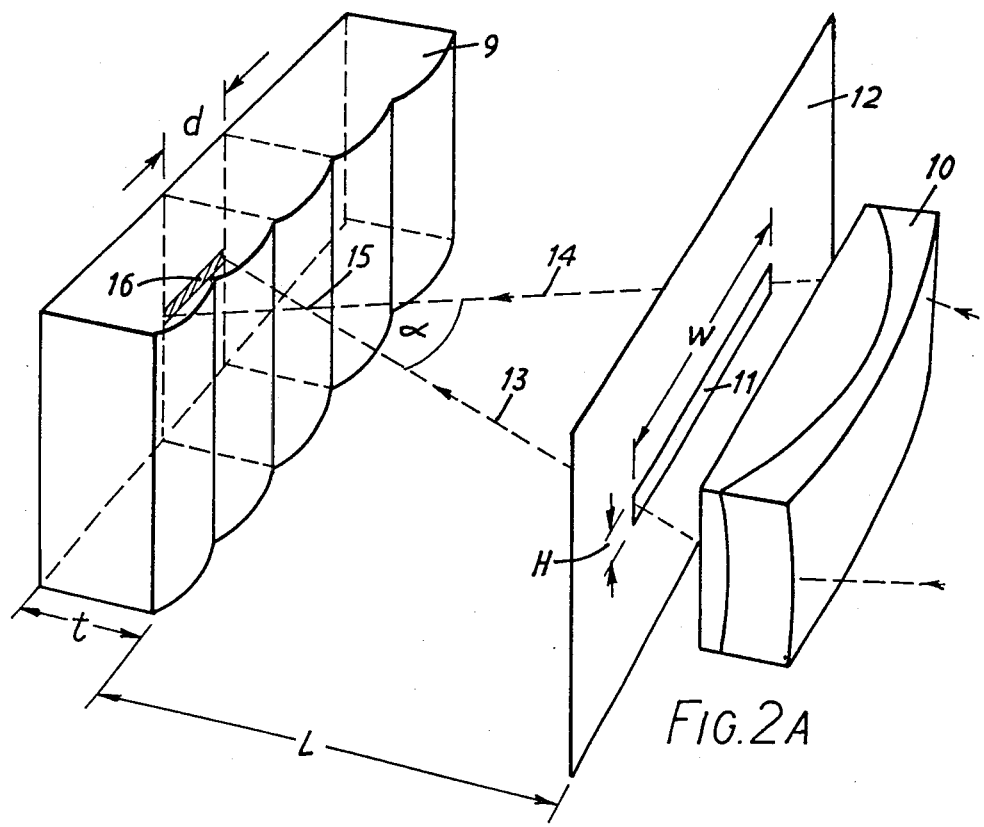
FIGS. 2A and 2B show diagrammatically how various dimensions in a conventional camera for use with respectively cylindrical and spherical lenticular film are related to the parameters of such film.

In FIG. 2A, a cylindrical lenticular film 9 is exposed to the image of an object field through lens 10 and a long narrow aperture 11 in plate 12. Two rays 13 and 14, shown as dashed lines arriving from the object field, represent respectively the most left and most right perspective of a point in the object field, whose image lies in the plane of the lenticular picture at point 15, which can be accommodated by the lenticular film and accordingly are accepted by aperture 11. The range of perspectives accepted by aperture 11 is imaged behind point 15 along a strip 16 of photosensitive emulsion, shown hatched. The length of this strip is limited to the lenticule width d, or it would encroach on the emulsion associated with the adjacent lenticule. It should be noted that the height of strip 16 is related to the imaging quality of lens 10 in the vertical direction. For points in the object field which are imaged outside the plane of the film 9, such as points A and B in FIG. 1B, normal depth of field arguments will apply with respect to the height H of aperture 11 which has width W. It follows that, using the same conventions as before, the angle α of convergence of rays 13 and 14 is the same as the viewing angle for the lenticular picture and that $$\tan\left(\frac{\alpha}{2}\right) = \frac{W}{2L}$$

where L is the distance of the aperture from the lenticular picture and becomes the optimum viewing distance.

In practice, the horizontal definition of a picture using cylindrical lenticules is limited to the lenticule width d, and a vertical picture definition much in excess of this is of little benefit. The resolving power of the photographic emulsion must, however, accommodate detail much finer than this dimension in order to distinguish between the range of different perspectives behind each picture "element".

Figure 2B:
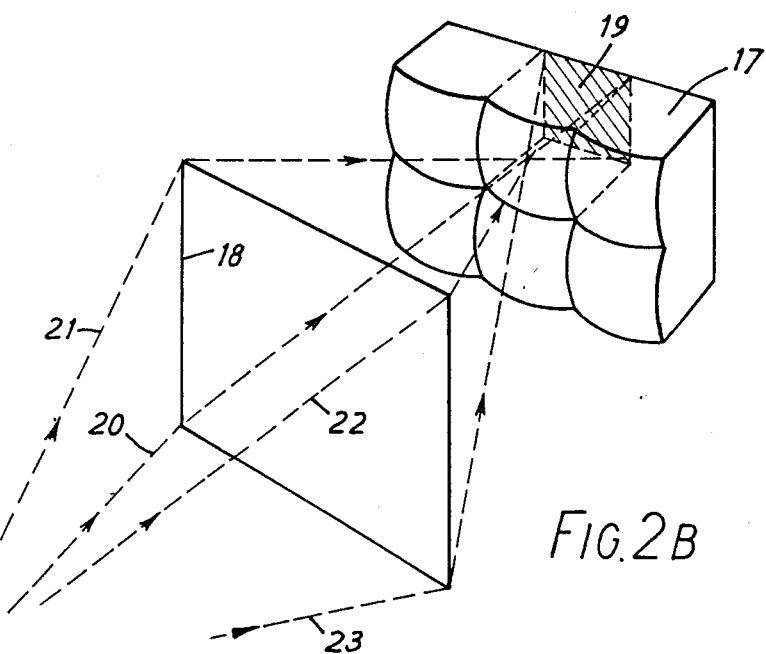

In FIG. 2B, a spherical lenticular film utilises the resolution of the emulsion behind each lenticule to the same degree both horizontally and vertically. In prior art proposals for cameras, such as that described in U.S. Pat. No. 3,683,773 (Dudley), a large aperture 18 of comparable horizontal and vertical dimensions is shown for capturing a significant range of perspectives of the object field both horizontally and vertically. In effect, each lenticule 17 forms a small image of the aperture 18 (shown in FIG. 2B as a hatched area 19) which is limited in width to that of the lenticule and abuts the images formed by neighbouring lenticules. Points in the object field are imaged onto film 17 through a lens close to aperture 18. Four extreme rays 20, 21, 22 and 23 are shown to converge onto the film after passing through the lens (not shown) and aperture 18. The formulae derived previously for one dimension for viewing angle and optimum viewing distance may be applied in both dimensions.

One arrangement for producing autostereoscopic pictures from a suitable transparent lenticular master is illustrated with reference to FIG. 3.

Light from a source 24 passes through condenser lens assembly 25 and a diffusing screen 26 so that light from every part of screen 26 would pass in a well distributed manner through a wide aperture in plate 27. The lenticular master 28 is placed immediately in front of diffuser 26, the width of the aperture in plate 27 and its distance from the lenticular picture being arranged to match the latter's viewing angle. The complete range of perspectives of the object field recorded on picture 28 is now imaged through plate 27 by lens 29 onto a lenticular film (screen and emulsion) 30. The ratio of the distance U from master 28 to lens 29 and the distance V from the lens 29 to film 30 determines the magnification M of the new image, where, to a good approximation, $$\frac{1}{F} = \frac{1}{U} + \frac{1}{V} \text{ and } M = \frac{V}{U}$$

It will also be apparent that the viewing angle β of the new image is related to the viewing angle α of the master approximately as M tan β = tan α

Figure 3:
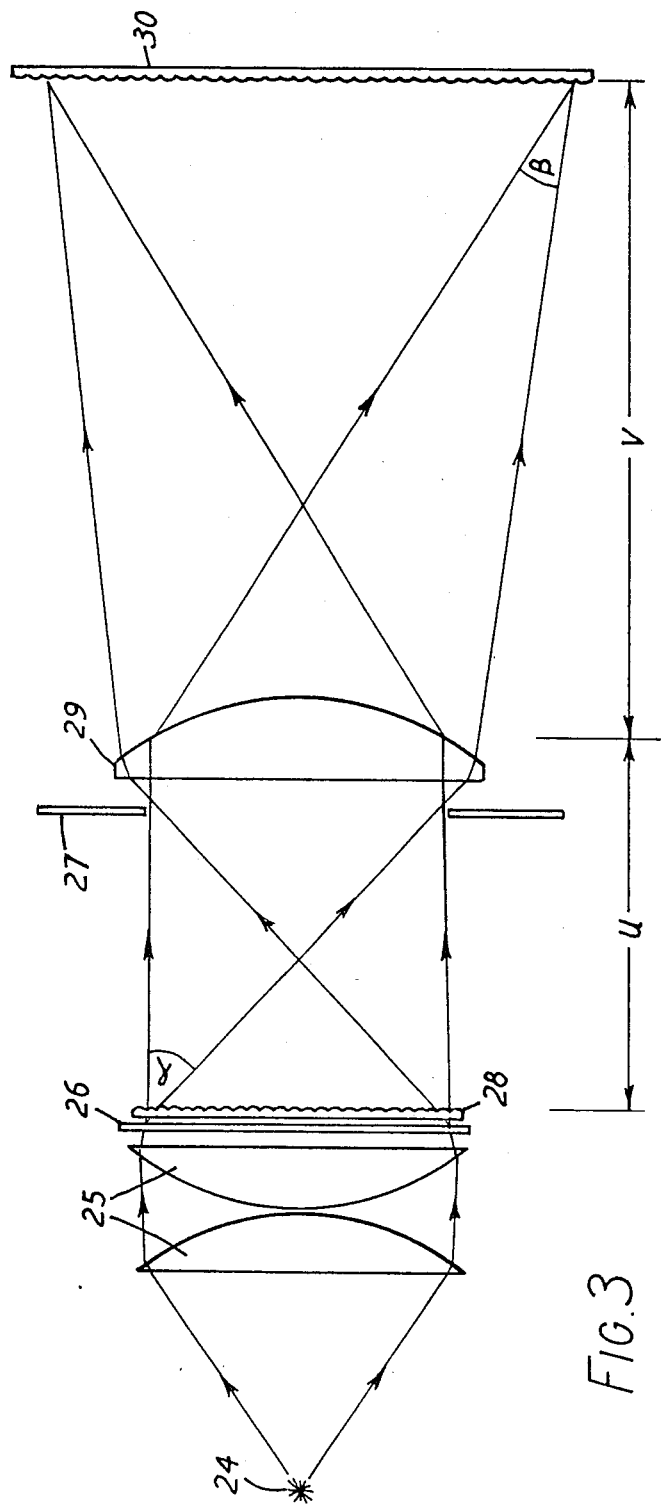
FIG. 3 shows how, in principle, one lenticular picture may be used to produce a second autostereoscopic picture.

There are a number of limitations when making reproductions from a conventional lenticular transparency like master 28 using the apparatus of FIG. 3. The first of these concerns the lenticule size of master 28 and reproduction film 30. If these are nearly equal (ie. M=1) then Moire effects will cause unwanted patterns on film 30. In fact, in order to avoid visible Moire patterns, lenticules should have a separation on screen 28 which is equivalent to about 60% or less of that of film 30. For a given viewing angle this implies a finer resolution of film emulsion to accommodate an equivalent number of distinguishable perspectives. In practice the master should accommodate more perspectives than the reproduction requires in order that quality of the end product should not be sacrificed.

The second limitation is concerned with the inherent optical aberrations of a conventional lenticular picture and is particularly severe where a magnification factor M greater than 1 is desired. For M=2 and a viewing angle $\beta$ of 23° on the final picture, the equivalent angle must be greater than 40° on the master. As previously indicated, a lenticular screen with a viewing angle of less than 25° can in principle accommodate in excess of forty different perspectives, whereas one with a viewing angle of 40° can cope with little more than twelve.

Figure 4:
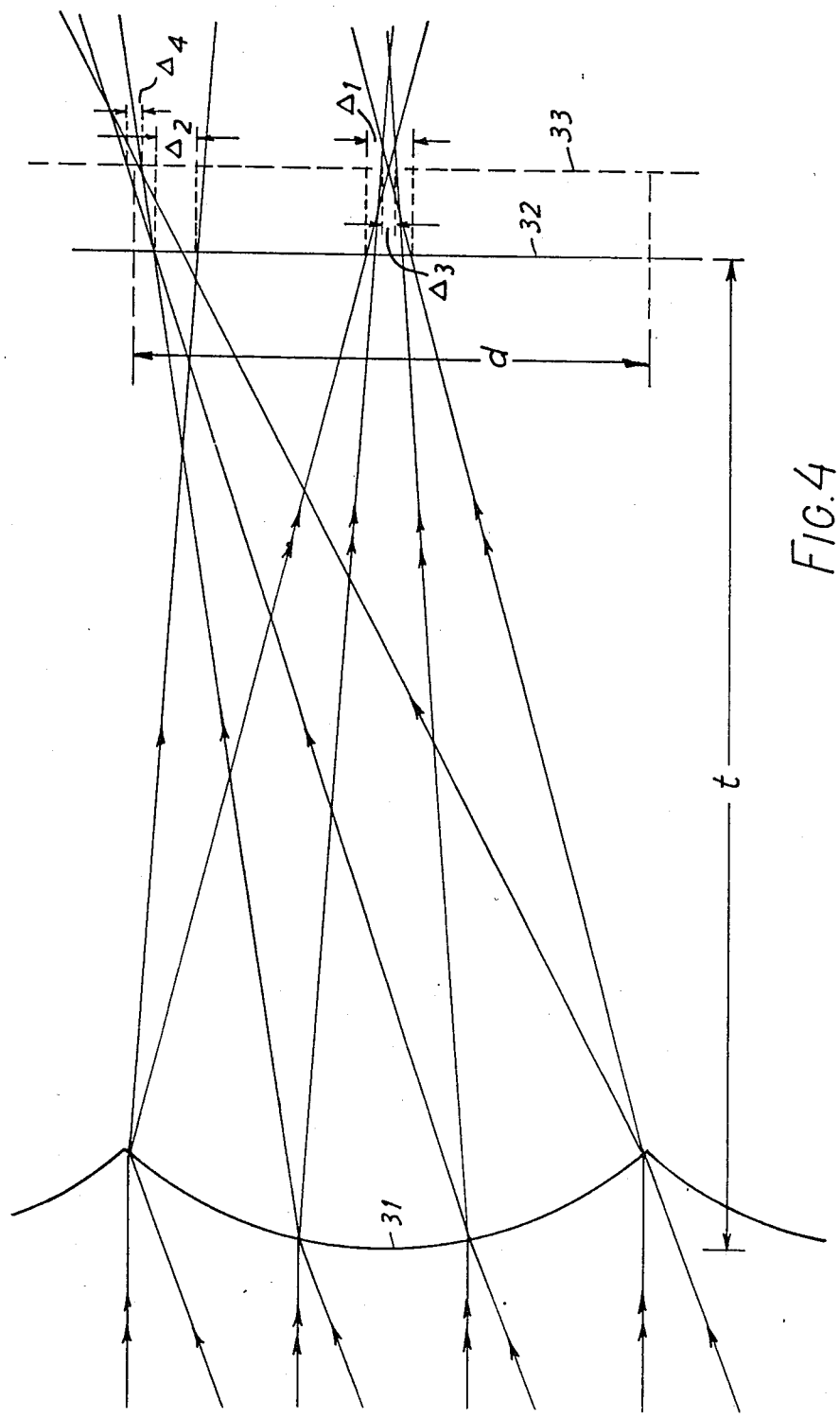
FIG. 4 shows schematically certain limiting aberrations of lenticular material and how these increase with viewing angle for conventional lenticular material.

The typical aberrations causing this limitaion are illustrated with reference to Fig. 4. Two groups of four rays are shown entering a single lenticule 31. The thickness of the lenticular material, which in this example has a refractive index of 1.52, is t and the lenticule width d. The group of rays (double arrows) entering the lenticular material at normal incidence (centre of viewing angle) reach a focus with some spherical aberration behind the back surface (emulsion) 32, whereas the group of rays (single arrows) entering at skew incidence and at the extreme edge of the viewing angle reach a minimum width with considerable coma just in front of surface 32. The position of surface 32 is a comprise which ensures that $\Delta_1$ and $\Delta_2$, the spread of the central and skew rays respectively, on surface 32, is optimised. The net result for a configuration in which skew rays enter at 20° from centre is that the spread $\Delta$ is approximately d/12.

If we only need to consider the inner pair of rays in each group, each approximately one third out from the centre of the lenticule on passing through its front face, then the optimum position on the back surface is at plane 33 when $\Delta_3$ and $\Delta_4$ are approximately equal and less than d/36. The limiting factor in this case is field curvature. This observation is of little practical value when considering the lenticular material conventionally. However it has bearing on aspects of the invention described below and will be referred to again.

In embodiments of the invention, autostereoscopic pictures can be produced with variation of perspective in one dimension, using smaller lenticules and accordingly finer emulsion, without requiring more light in the picture taking step. It is generally true that the sensitivity of photographic emulsion decreases rapidly with decreasing grain size. If a cylindrical lenticular picture of a given size had its lenticule width and grain size halved, the exposure time would very likely have to be increased by four or more. It is generally desirable for the end product (lenticular print or transparency) to have cylindrical lenticules, so that vertical changes in the observer's position do not alter the perspective views seen by each eye. The intermediate master, however, need not suffer this constraint.

Figure 5:
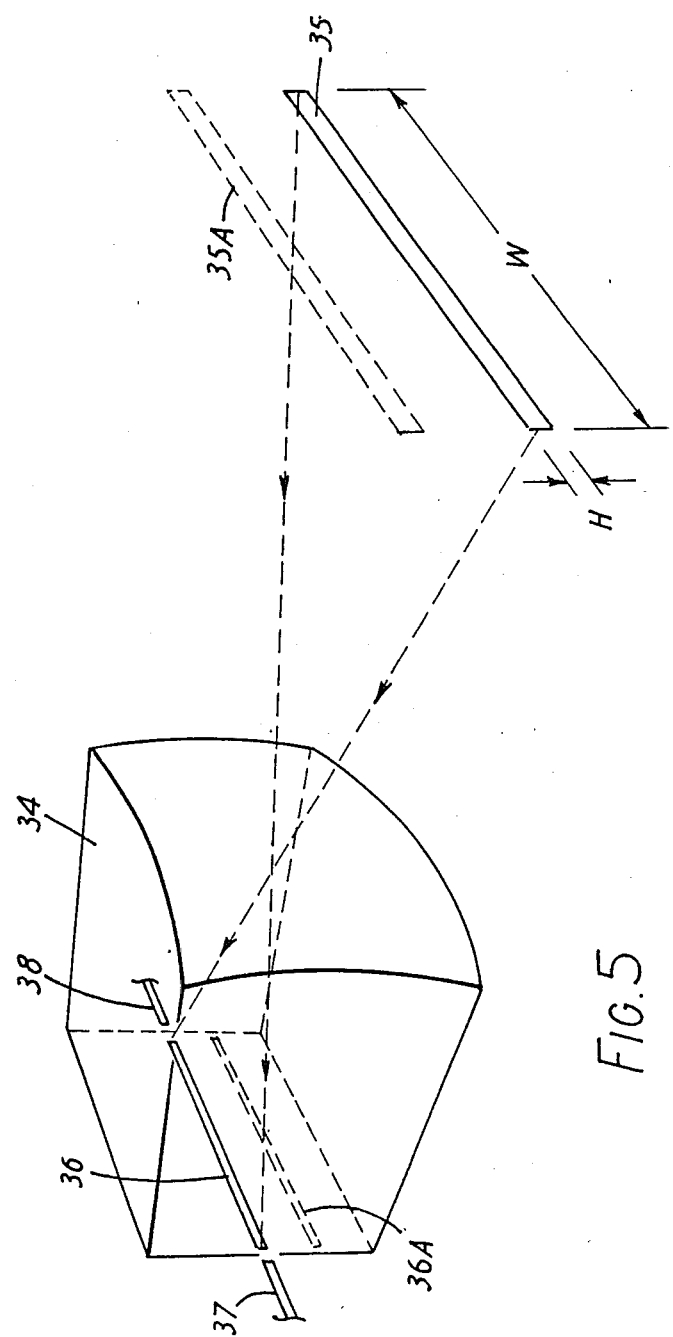
FIG. 5 is a diagram showing how the efficiency of recording autostereoscopic pictures accommodating perspective changes in substantially one direction only, may be significantly improved by using spherical lenticular material in apparatus according to a first embodiment of the invention.

One embodiment of the invention which uses spherical lenticular film to capture one or more records of an object field in a very efficient manner is illustrated with reference to FIG. 5.

A single spheroidal lenticule is shown schematically as a volume 34 of lenticular material. For the sake of clarity it is shown grossly enlarged with respect to an elongate aperture 35 as employed when taking autostereoscopic pictures with cylindrical material. An image 36 of this aperture is formed on the back surface of the material. It will be apparent that neighbouring lenticules (not shown) above, below or at the sides of lenticule 34 will form similar strip images. Parts of two such images are shown as 37 and 38 and it will be seen that their ends abut the ends of image 36. For a square lenticule boundary, the aspect ratio of the aperture 35, W/H, represents the increase in efficiency for given aperture size with which the emulsion is used, ie. the proportions of the emulsion used in forming an image of the object field. This would typically be of the order of 20:1 as nineteen strips similar to strip 36 could be formed side by side behind the lenticule 34. A very useful feature of this embodiment of the invention is that it allows for further autostereoscopic pictures to be recorded behind the same array of lenticules, simply by moving the generally rectangular aperture 35 relative to the lenticular array to a position such as 35A which is parallel to the previous position of the aperture. A corresponding image 36A would then be produced on the emulsion behind lenticule 34. Even allowing for aberrations as illustrated with reference to FIG. 4, a series of ten such distinct images would be comfortably accommodated behind each lenticule, any one of these being selectable by a suitable reproduction system by appropriately placing a generally rectangular aperture to correspond to the taking aperture position. The series of images may be of completely unrelated subject matter, as in a film cassette, or could be a sequence or time series of the same subject matter. It is also possible to use the dimension orthogonal to the strip image of the aperture to record the colour content of an image on black and white photographic emulsion, as described below.

As shown above, efficiency is improved in terms of exposure requirements (time and/or light level) for small lenticule width and film grain size by utilising spherical lenticules in a process for taking autostereoscopic pictures having substantially perspective change in one direction only. Such an arrangement has been shown to provide a number of other related advantages. In fact, preferred embodiments of the current invention go considerably further by departing radically from one of the conventional constraints placed on lenticular pictures. These allow, by a suitable rearrangement of lenticule orientation with reference to the camera's elongate taking aperture, the length of the aperture's image behind each lenticule to significantly exceed the lenticule's width. This is illustrated with reference to FIGS. 6A and 6B, which shown lenticular film used in accordance with a second embodiment of the invention.

A small region of spherically lenticulated material is shown in plan elevation in FIG. 6A and in sectioned side elevation in FIG. 6B. The boundary of broken line grid 39 (FIG. 6A) approximates to the dimensions of a normal lenticule of width d which, tipped at an angle of arc tan (⅓) (approximately 18.4°), would form an image of the camera's taking aperture within the rectangular boundary 40 on the back surface 41 of the material of thickness t. The broken line 42 (FIG. 6B) represents what would be the surface of the lenticule. In fact, the area 39 is broken into nine smaller areas, each of which forms its own image of the elongate aperture in a tightly packed but unambiguous record on surface 41. In this configuration, the camera aperture's aspect ratio (length to height) is conveniently greater than 10 to 1, allowing for a small boundary of unexposed emulsion around each image formed and thus no unwanted overlap. In practice, a ratio of 15 to 1 might be employed, allowing also for tolerances of a geometric nature. Each lenticule is much smaller than before and, returning momentarily to FIG. 4, it will be apparent that each lenticule is represented by the central portion of lenticule 31 and that a large number of distinct perspectives may be recorded at a position equivalent to plane 33 (in fact on surface 41). For a given viewing angle, say 25° or more, in which the emulsion may have become the limiting factor on the number of distinct perspectives, a smaller lenticule size may nevertheless be employed, thus producing better picture resolution.

The "number of distinct perspectives" is taken to mean the number of equally spaced discrete directions at which parallel light may enter a lenticule within the overall viewing angle α so that, for any given discrete direction, the area of optimum focus on the rear surface of the lenticular screen does not overlap the corresponding areas for the adjacent discrete directions on either side. For a conventional lenticular structure of refractive index μ the number of distinct perspectives N can be shown from the prior art to follow an approximate relationship in which $$F = N \left[ \frac{\alpha}{2(\mu - 1)} \right]^{2.2} \leq 7$$

where α is given in radians, and F is taken to be the lenticular Figure of Merit.

In the example given, the limiting constant exceeds 16, representing a very significant improvement on the prior art.

Returning to FIG. 6A, in the general case, where the small lenticules are arranged on a lattice having a repetition length a along one axis, b along the second axis and in which the axes are at an angle of θ to one another, the length of the strip image behind each lenticule is given by the expression, $$l^2 = n^2 a^2 + m^2 b^2 - 2 \, nm \, ab \cos \theta$$

where n and m are integers with no common prime factors. The available height of the area in which one or more strip images of the taking aperture must be recorded is given by $$h = \frac{ab \sin \theta}{l}$$

In practice, μ may be taken as an effective refractive index where lenticular structures more complex than a single homogeneous lenticulated sheet are employed. Examples of such structures include the above-mentioned crossed-cylindrical form and a sheet having regions of different refractive index. In the example a square lattice has been chosen (a=b and θ=90°), with n=3 and m=1. In summary, for a particular viewing angle α, approximately 40°, the present embodiment of the invention has allowed a linear increase in picture resolution (reduction in lenticule width) of a factor of 3 at the same time as increasing the number of distinct perspectives recorded beneath each lenticule by a similar or greater factor, when compared to the spatial and angle resolution expected in the prior art.

Even allowing for some tolerance, a lenticular Figure of Merit comfortably in excess of 14 is achieved in the illustrated example. Other configurations will typically lead to different levels of improvement. Thus, where n=m=1, a Figure of Merit comfortably in excess of 8, a worthwhile improvement over the prior art, may be expected. It is assumed, throughout, that the physical dimensions of the lenticules exceed those at which diffraction effects become significant.

Thus, it will be seen that by tipping the elongate aperture relative to the array of lenticules, so that the longitudinal axis of the aperture is out of alignment with the co-ordinate axes of the array, the length of each recorded image can be greater than the width of the corresponding lenticule of the array. As shown in FIG. 6A, with the aperture tipped at 18.4° to one of the axes, the length of each image is greater than three times the width a of the corresponding lenticule. With square lenticules of width a, if the angle of the aperture relative to an axis of the array were increased to 45°, the length of each image could be approximately 1.4 a, which would still give a useful improvement over the prior art arrangement of FIG. 2, where the length of the image does not exceed the lenticule width.

In practice, embodiments of the invention would employ non zero and different values for the integers n and m, and the orientation of the long dimension of the image formed beneath a lens element would be such that a line drawn through the optical axis of one lens element having this direction would not pass within allowable tolerances through the optical axis of another lens element which is within two lens element widths of the first lens element's axis.

A precut sheet of lenticular film manufactured in accordance with this invention is shown diagrammatically in FIG. 6C. The edges of this sheet film typically define the format of the picture (or intermediate record) taken. The co-ordinate axes A and B of the lenticular array are tipped at an angle of 18.4° with respect to the picture axes Y and X respectively and, in use, with respect to the taking aperture of the camera. For reasons of clarity, the lenticules are not drawn to scale and would, in practice, constitute a fine mesh.

It is this precise geometric relationship which, for a given aperture geometry, ensures that the film is correctly positioned with respect to the taking aperture. In this example, a single image corresponding to the elongate aperture, or a series of such images spaced in a direction normal to the long dimension of each aperture, may be formed with a length more than three times that of its corresponding lenticule, providing the width of the image or group of images corresponding to this lenticule does not exceed one tenth of its length.

In practice, there will be tolerance factors, and an aspect ratio of 15 to 1 may be used for this particular geometry. This would leave room for an allowable error of 2.7° in the orientation of the lenticule array.

Certain components of a camera in accordance with the invention are illustrated with reference to FIG. 7. Two representative rays from an object field are shown to enter the camera through a long narrow aperture 43 in plate 44. In order to capture a significant range of perspectives this aperture may be 150 mms long but have a height of only 2 to 5 mms. In practice a group of small apertures substantially spread over an elongate area may provide some mechanical advantages in construction and fulfil the requirements of an elongate aperture means. The number of such apertures would ideally match the resolution capability of the recording medium. Elongate aperture means may, in practice be constructed by creating the long dimension of this means as the composite result of scanning one or more smaller apertures through the required length.

Spherically lenticulated film, configured as shown in FIG. 6A, allows the strip image recorded through each lenticule to have an aspect ratio of, say, 10:1, which corresponds to at least three times the height of the image aperture 43, assuming its length and distance from the lenticules correctly match the viewing (acceptance) angle. The embodiment here described uses this additional available height to record colour information without requiring colour emulsion.

Lens assembly 45 is long enough to accommodate rays from the entire length of elongate aperture 43. If lens 45 is a simple convex lens it forms one image of the object field at a specially constructed reflecting component 46. Alternatively, lens assembly 45 may have a number of generally spheroidal portions side by side, the front portion being visible in FIG. 7 and each portion facing a section of aperture 43 and a horizontal slot 47, hereinafter described. In practice, the side by side portions of assembly 45 may be generally cylindrical providing the combined optical powers of front and rear surfaces results in a number of adjacent images of the object field at component 46. The general curvature of this component in the vertical plane is centred on a line slightly beyond lens assembly 45 so that, to a first approximation, aperture 43 is imaged onto the centre line of a second slot 47 in plate 44. This slot is considerably higher than 43, its height typically being somewhat less than 0.1 of its length and matching the configured lenticular film 48 on which lens 49 forms the recorded image. A small region 50 of component 46 is shown enlarged both in horizontal and vertical section in FIGS. 7A and 7B.

Figure 7A:
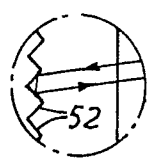

FIG. 7A shows that the rear side of reflecting component 46 is provided with vertically extending reflecting 90° V-grooves 52. These grooves have the property of returning incident rays in the same horizontal direction from which they came. In addition to nulling out to a good approximation horizontal aberrations introduced in the image formed by lens assembly 45, this ensures that the recorded image is an orthoscopic record of the object field; that is to say, distant objects are seen to lie behind the film surface whilst near objects appear in front.

Figure 7B:
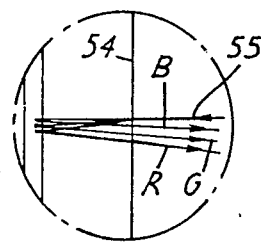

FIG. 7B shows the same region 50 of component 46 in vertical section. The front surface 54 at which light first enters as ray 55 has colour dispersive properties and causes the ray to be split into its various colour components. A diffraction grating is a typical example of such a dispersive structure, the red component being deflected more than the blue. Red, green and blue components are shown diagrammatically as the three rays in the figure and labelled R, G and B, respectively. Other dispersive structures employing surface relief or bulk diffraction within the thickness of component 46 may be used to achieve similar results.

Thus, whilst the vertical focussing action of reflecting component 46 generally images light passing through slot 43 onto slot 47, the dispersive action of grating 54 breaks this image vertically into its various colour components, blue being near the top of slot 47, green in the middle and red near the lower edge, the action of lens assembly 45 being to make these components approximately parallel. Internal reflection by prism 56 separates the light from the input of the camera and directs it through an imaging lens 49. This lens reimages the various colour components of a particular image point onto film 48, there being a spread of angle of incidence which depends on colour, in a direction orthogonal to the long axis of the camera's aperture 43. A small region 57 of film 48 including such an image point is shown enlarged in FIG. 7C. The red, green and blue components (R, G and B) are imaged onto different narrow bands within a strip image of height h underneath spherical lenticule 59. It is clear that the photosensitive layer 60 may be monochromatic, typically but not necessarily black and white photographic emulsion, since a colour image can be reconstituted from the information recorded beneath each lenticule by suitable positioning of colour filters in the rectangular aperture of a reproduction system.

Figure 7:
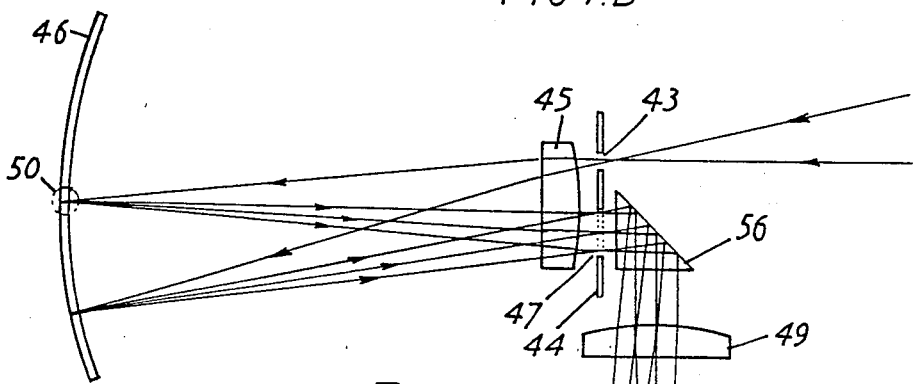
Figure 7C:
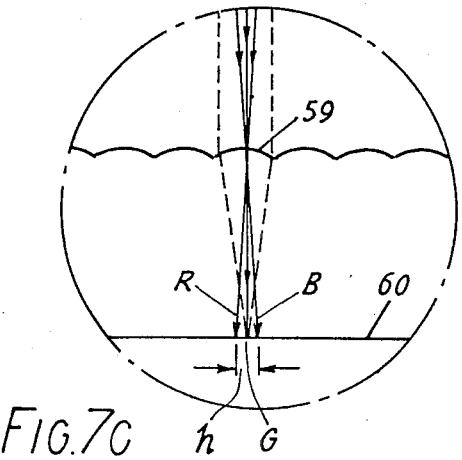

The embodiment of FIG. 7 employs a colour dispersive component 46 to spatially separate the colour components of each image point underneath each lenticule. Other embodiments are possible in which the spatial separation of colour is achieved more simply by using a taking aperture of some height (typically one tenth of its width) which is provided with blue, green and red filters, each of full aperture width and one third or less of aperture height. There will be a small loss of precision in this method due to the vertical change in perspective between colours. This will be particularly noticeable for subjects which are imaged some distance away from the plane of the lenticular picture. To overcome this problem, for subject matter of substantial depth, a narrow stationary aperture may be used, providing the film is tipped about a horizontal axis during the exposure period. The colour filters are effectively fixed in relation to the film and move past the aperture sequentially. In effect, the relative position of the narrow aperture with respect to the film covers the entire area of the full aperture required to fully expose the area of emulsion assigned to each lenticule.

Film 48 in FIG. 7 is spherical lenticular film and records an array of strip images of the aperture on emulsion behind the lenticules, each image comprising a range of perspectives of the object field in one direction and substantially no perspective change in the orthogonal direction. After processing the picture could be viewed directly, but the observer would need to do so from a precisely defined vertical position corresponding to the relative position of the aperture in the picture taking process, in order to receive rays from the array of strip images, each of the latter being seen through its corresponding spherical lenticule. In practice, this is unsatisfactory as small movements would be likely to occur and the picture would be lost from view. This practical difficulty in viewing can be overcome by treating the film 48 as an intermediate record. By transferring the recorded images onto, for example, cylindrical lenticular film, an autostereoscopic image of the object field may be provided which can be viewed directly without the need for careful positioning. For cylindrical lenticules running vertically, slight side-toside movement of the viewer's head enables the range of perspectives of the object field to be seen, whilst on vertical movement there is no perspective change but the cylindrical lenticules permit viewing from a range of angles relative to the horizontal.

An apparatus in accordance with the invention for viewing and/or producing an autostereoscopic picture from an intermediate lenticular record such as one produced by the apparatus of FIG. 7, will now be described with reference to FIGS. 8, 8A. For the sake of compactness, certain components and paths of light in planes perpendicular to the paper and along axes of symmetry of the system have been drawn in broken line form in the plane of the paper. The main drawing (solid line) represents a vertical section (plane of symmetry) of the apparatus.

A horizontally extending light source 61 acts in conjunction with a rectangular diffusing screen 62 to provide substantially uniform illumination from every point of screen 62 for a pair of fresnel condenser lenses 63 which cover the entire area of the transparent lenticular film record. (Alternatively a scanning point source could be used). Light enters record 64 from the picture bearing (rear)surface. The prime function of the lens assembly 63 is to direct light from the source through every part of lenticular film 64 generally towards an elongate aperture 65 of width W and height H in plate 66. The distance L of aperture 65 from lenticular film 64, its horizontal and vertical dimensions W and H, and its orientation relative to the lenticular array correspond to the distance, size and orientation of the taking aperture relative to the lenticular array during its original exposure. This ensures that each strip image recorded beneath its respective lenticule is reimaged through aperture 65 provided that the strip receives appropriate illumination from behind. This is accomplished by properly selecting the height and width of diffusing screen 62 and correctly positioning the screen. The necessary angles subtended both vertically and horizontally by screen 62 at the surface of film 64 are calculated with reference to a schematic enlargement of a small region 67 of the film. FIG. 8A shows a single lenticule 69 at a distance t' in front of its associated strip image 70. For the sake of convenience t' is the equivalent air separation between lenslet and back surface so that internal and external light ray directions may, to a first approximation, be considered equivalent. (t'=t/μ, where t is the thickness of lenticular material and μ is its refractive index).

For square lenticules of width d, and strip image dimensions of l (length) and h (height), it follows that, for the left-hand edge of strip 70 to pass light through the most right edge of lenticule 69 and vice versa, the horizontal angle α' subtended by screen 62 at the film is given by the relationship, $$\tan\left(\frac{\alpha'}{2}\right) = \frac{(d+l)}{2t'}$$

Likewise the vertical angle β' subtended by screen 62 at the film is given by, $$\tan\left(\frac{\beta'}{2}\right) = \frac{(d+h)}{2t'}$$

These two angles should not be confused with the viewing angle of the lenticular film as previously defined, which is the angle subtended by the strip image when viewed through the lenticule itself. To a good approximation this is α horizontally and β vertically in which, $$\tan\left(\frac{\alpha}{2}\right) = \frac{l}{2t'} \text{ and } \tan\left(\frac{\beta}{2}\right) = \frac{h}{2t'}$$

Detail 68 also shows that, in order to achieve the efficiencies provided by the invention, the edge of the lenticule is tipped by an angle φ with respect to the direction of strip image 70. In the example illustrated, φ is approximately 18.4° corresponding to tan φ=⅓ (as for the film shown in FIG. 6). The horizontal viewing angle of the film α is about 40°, t=0.43 mm, d=0.1 mm, l=0.32 mm and h=0.03 mm.

It now follows that α'=51° and β'=17°, set against values of 40° for α and 4° for β which are the angles subtended by aperture 65 at film 64. To a first approximation, the fraction of light f passing through any specific point of the emulsion, which is collected and reimaged by the particular lenticule associated with this point is given by the expression $$f = \frac{d^2}{(l+d)(h+d)}$$

Consequently, aperture 65 will pass no more than 18% of light transmitted through lens assembly 63 and film 64. Some loss of light occurs, but this is not critical in practice, and the arrangement ensures that the lenticular record is precisely reimaged through an aperture 65 which is equivalent to the taking aperture of the camera employed to expose the original lenticular image. Where the intermediate record has captured a small range of perspectives vertically by being exposed through a taking aperture of same height, then since the lenticular reproduction can typically only accommodate perspective change horizontally, its depth of field can in fact often be improved by stopping down aperture 65 in the vertical dimension.

In this embodiment, plate 71 in front of aperture 65 forms part of a shutter and carries three optional colour filters, each occupying one third of the height of aperture 65. These are used to reconstruct a colour image from a record in which colour information has been spatially separated on black and white emulsion beneath each lenticule.

A narrow pencil of three rays 72 in the vertical plane passes through aperture 65 from a point in the middle of film 64. The apparatus of FIG. 8 is adapted to receive both orthoscopic and pseudoscopic lenticular records, and a semi-reflecting mirror 73 is provided to deflect light into the vertical optical path of the system. In fact, although the apparatus would normally be supplied with two stations (76, 84), only one would be set up for use at any one time, depending on the nature of image required. It may in some circumstances be desirable to use the apparatus as a viewer—printer where one station is used for viewing and the other for printing. With screen 76 only set up, mirror 73 is unnecessary. The pencil of rays 72 is focussed by lens 74 to a point 75 on a conventional cylindrical lenticular screen and emulsion 76. Two skew rays 77 and 78 are shown to correspond to image points at the top and bottom of what is an enlarged image of the original lenticular record. The lenticules run vertically on the cylindrical lenticular reproduction.

Remembering that the broken lines represent rays in the horizontal plane, rays 79 and 80 which are the most extreme rays passed by aperture 65 in the horizontal plane, converge onto an image point at the extreme right-hand edge of the picture and at an angle corresponding to the viewing angle of the cylindrical lenticular screen. The width W of this aperture 65 may be adjusted in order to match the viewing angle of lenticular film 76 with its distance from aperture 65 as seent through lens 74. The only limitation on this adjustment is that W should not exceed the full width accommodated by the strip images (such as 70) as imaged by the lenticules (such as 69) of the film 64.

An extremely useful feature of the arrangement as illustrated is that the scaling factor (2× in the example) of the image and the optimum viewing distance may be independently adjusted. Ray 81 corresponds to the most left perspective of a point on the extreme left hand edge of the picture, whereas ray 79 corresponds to the most left perspective of a point on the extreme right hand edge of the picture. (Ray 80 corresponds to the most right perspective of this same point). For viewing purposes we may extrapolate rays 79 and 81 backwards to point A at which they meet. To a first approximation, extreme left perspectives of all image points may be viewed from this point. Conversely all extreme right hand perspectives may be viewed from the point B. The line AB represents a base line from which picture 76 may optimally be viewed. Its distance V from the film is four times the distance L, corresponding to the taking distance for record 64, and its length may be more than twice the width of the taking aperture. This can be a very big advantage in a practical system, where taking distance should be short to ensure a compact camera, whereas viewing distance for the same size picture may ideally be considerably greater. (Reading distance for a small picture and up to one meter for a 25 cm×20 cm enlargement).

The uncoupling of viewing distance from scaling factor is achieved by varying the distance between the aperture 65 and lens 74, independently of the aperture's distance from record 64. Having fixed the position of the lens and thus its distance from the film, its focal length may be selected to provide the appropriate magnification factor. It will be clear that as lens 74 is moved further from the aperture 65 its size requirements increase and there is a practical limit to this.

A different mechanism which allows viewing distance to be altered almost independently of scaling factor is illustrated in the vertical optical arm of the arrangement. This part of the system has another important function. It is adapted to make reproductions of orthoscopic records, retaining the orthoscopic properties in the reproduction. Conversely the horizontal arm of the arrangement converts a pseudoscopic record (background objects appear nearer than foreground objects) into an orthoscopic record (natural perspective). Where the taking camera produces a pseudoscopic record that is appropriate. However, where an orthoscopic record has been taken, image inversion is not desirable.

Semi-reflecting mirror 73 reflects light passing through aperture 65 upwards through lens assembly 82. Typically, this may consist of one or more imaging components placed side by side along the length of aperture 65. Assembly 82 forms one or more images of lenticular record 64 at or near a retro-reflecting screen 83. This may consist of an array of small spherical elements or a series of corner cube reflectors. The property of screen 83 is that any ray reflected by it is to a good approximation returned down its incident path. By ensuring that it is near the focus of the image of record 64, a minimum degree of blurring is introduced due to deviations from this behaviour. A further improvement in image quality may be obtained by moving screen 83 in its own plane during the exposure of the reproduction 84, which receives light through semitransparent mirror 73, aperture 85, equivalent to 65, and two lenses 86 and 87. If it were not for the function of lenses 86 and 87, and if lenticular film 84 were placed at a distance L from aperture 85 (equal to the distance between film 64 and aperture 65), then an exact replica would be produced. By using cylindrical lenticular film, however, this could be viewed from all vertical perspectives. Superfine emulsion could be used as exposure times and light levels would not prove an obstacle at the reproduction stage.

To obtain an enlarged image (again 2× in the example) a negative lens 86 is used to push the point at which the image of record 64 is formed further away from aperture 85. Lens 87, placed near film 84 and weakly convergent, independently pushes the virtual image of aperture 85 out to a line joining points C and D and achieving a result similar to that described previously for the horizontal arm of the arrangement.

The arrangement as described with reference to FIG. 8 may also be used to project and view an autostereoscopic record in real time. In order to achieve this conveniently, the lenticular screen 76 is replaced by two components. The first is a condenser lens which reimages the virtual image of aperture 65 as seen through lens 74 onto the observer's viewing position. This reduces the highlight problem. This lens may be a light weight fresnel component of the type used in assembly 63. The second important component, in making a real autostereoscopic image which can be readily viewed, is an anisotropic diffusing screen placed in close proximity to the condenser. This must diffuse vertically but not horizontally to any substantial extent, or different perspectives in the horizontal plane would become confused. A good example of such a component is a cylindrical lenticular screen with its grooves running horizontally. It is also possible to make a component holographically which displays such behaviour.

It is important to note that an orthoscopic record, when viewed along the horizontal axis back towards aperture 65 through the arrangement described above, will appear orthoscopic. A pseudoscopic record, whilst producing an orthoscopic reproduction at lenticular screen 76 when viewed from line A B, is seen as pseudoscopic when viewed from the other side of the position of screen 76. A more complex arrangement involving two lenticular screens and a diffusing screen in place of screen 76 can be used to make the necessary image inversion. An alternative viewing position for a pseudoscopic record is below screen 84 replacing this with an arrangement as described above, as screen 83 introduces the necessary image inversion.

In practice, an important option follows from the viewing arrangement as described above for an orthoscopic record (through a pseudoscopic record may also be used). The use of a condenser and vertical diffusing screen in the place of component 76 creates a real orthoscopic image of the original subject matter as recorded on the orthoscopic record. Unlike the original object field, it is possible to place a photographic plate in this real image field. Furthermore, unlike many real object fields, the orthoscopic record may relatively easily be illuminated by a coherent source of light such as would typically be used in forming holograms.

It is therefore practical using the invention to create a real orthoscopic image composed of coherent light and by mixing this with a reference beam, in a manner well known in the prior art, to construct a hologram on a photosensitive medium at a position equivalent to that of component 76. This may be an image plane hologram of a subject on a scale to be selected and, given apparatus with a narrow horizontal aperture, will only display perspective changes horizontally. It should further be noted that full colour information may be recorded with respect to any object field. This may be captured on colour emulsion or alternatively spatially separated on black and white emulsion. Using the invention, such a lenticular record may be transformed into a hologram in which all original colours are reproduced monochromatically using a single coherent wavelength and a black and white intermediate record. Alternatively, each colour component of, say, a three component (RGB) record may be holographically encoded on a suitable medium, so that, when the final hologram is viewed, the three autostereoscopic components are seen together as a single full colour three dimensional image.

Although the same result may be achieved in different ways, the simplest example of an arrangement which will allow three colour components to be recorded and viewed using a single holographic plate is one in which the area of the plate is divided into a number of regions carrying different coloured optical filters, along similar lines to the well established Dufay principle employed in the manufacture of colour transparencies using black and white emulsion in conjunction with red, green and blue colour filters. Ideally such filters would run horizontally, so that their width, does not affect the holographic resolving ability in the horizontal dimension in which the range of perspectives of the object field must be accommodated. In this embodiment, the red component of the hologram is recorded beneath the red transmission filters, the green component beneath the green filters and the blue component beneath the blue filters.

A further embodiment of the invention permits the production of a lenticular autostereoscopic image without a constraint imposed by the arrangement illustrated with reference to FIG. 8. In the latter arrangement, the viewing angle $\beta$ of the autostereoscopic image is, to a good approximation, related to the magnification factor M between it and the intermediate record by the relationship $$M \tan \beta = \tan \alpha$$

where $\alpha$ is the viewing angle of the intermediate record. This relationship is clearly illustrated by reference to FIG. 3. It can be seen that if M>1, then $\alpha$ is larger than $\beta$ and is defined by the magnification factor. As described below, magnification may be achieved without this constraint on the viewing angle of the resultant autostereoscopic picture.

FIG. 9 shows one apparatus according to the invention where the constraint is avoided. An intermediate record 88 is enlarged by lens 89 onto a lenticular screen and film combination 90. A small aperture 91 corresponds in length and initial position to a portion of the length of the aperture used in recording the intermediate record and thus selects rays from only a fraction of the range of perspectives recorded. Aperture 91 is moved uniformly during the exposing process across lens 89 parallel to the direction of perspective change of the array of images on record 88, and through a distance corresponding to the length of the taking aperture which subtends an angle $\alpha$, the viewing angle, at record 88. Efficient illumination of aperture 91 is achieved by imaging a compact light source 92 through a condenser arrangement 93. The source 92 is moved in synchronism with aperture 91 so that its image tracks the latter.

As aperture 91 is moved to point 94 it sweeps out an angle $\beta$ at lenticular screen 90. It is assumed that the viewing angle of screen 90 is $\theta$ which is greater than $\beta$. By rotating screen 90, about an axis through point P which is normal to the direction of perspective change of the autostereoscopic image being recorded, through an angle $\gamma$ in synchronism with the movement of aperture 91 through angle $\beta$ in the opposite direction this viewing angle is such that the space behind the lenticules on final screen 90 is filled completely providing $$\gamma = \theta - \beta$$

In this way, any viewing angle may be accommodated by suitable selection of angle $\gamma$ regardless of magnification factor between record 88 and screen 90.

The embodiment illustrated in FIG. 9 utilises a wide lens similar to that used in the enlarger illustrated in FIG. 8. It will be appreciated that a pseudoscopic intermediate record is inverted to an orthoscopic autostereoscopic image on screen 90. Lens 89 remains fixed relative to the intermediate record 88, whilst the aperture moves relative to the intermediate record and screen 90.

It may, alternatively, be convenient to enlarge an intermediate record produced by recording apparatus according to the invention with an arrangement using a conventional enlarging lens. This is illustrated with reference to FIG. 10.

Referring to FIG. 10, a conventional flat-field lens 95 with a small aperture 98 forms an image of intermediate record 96 at lenticular screen and film combination 97. Record 96 is illuminated in a manner (not shown) similar to the arrangement of FIG. 9. In the current arrangement, the record 96 is moved through a distance L1, in the direction parallel to the direction of perspective change of the images on the intermediate record, screen 97 is simultaneously moved through a distance L2 in the opposite direction. The different perspectives of the object field recorded on record 96 are thus transferred on to film 97, thereby producing an autostereoscopic image picture without lens of registration, provided $$L_2 = M \times L_1$$

As illustrated, the viewing angle $\alpha$ of record 96 is equal to the viewing angle $\beta$ of the screen 97. If, however, there was some difference between the two angles this could be accommodated by an appropriate rotation of record 96 or screen 97 similar to that illustrated for screen 90 in FIG. 9.

In this embodiment, the aperture 98 remains fixed relative to the lens 95 and the movements of intermediate record 96 and screen 97 take place relative to the aperture lens. Consequently, in contrast to FIG. 9, the apparatus of FIG. 10 does not invert the image, and an orthoscopic autostereoscopic image is produced from an orthoscopic intermediate record.

It will be clear that a record which contains colour separated information in the direction orthogonal to that of perspective change is accommodated by the enlargement arrangements of FIGS. 9 and 10, by extending the aperture in that direction to accommodate the full width of the composite record and introducing appropriate colour filters in the aperture spaced in the same direction. p In summary, embodiments of this invention provide a number of advantages over the prior art. In particular, three dimensional pictures displaying significant perspective changes in one direction only can be taken with a very high degree of efficiency, requiring, for a given F-number of the taking camera, less light per image for a given emulsion than would be required for a conventional wide aperture camera employing cylindrical lenticular film and providing a similar number of distinct perspectives.

It is possible to produce horizontally autostereoscopic pictures with a degree of animation by capturing a time sequence of a subject, each recorded element corresponding to a particular instant being reimaged at a specific vertical position of the observer relative to the normal at the centre of the picture.

By rotating the axes of the lens array (lenticular screen) (as shown in FIG. 6C), aberrations may be reduced for a particular viewing angle whilst, at the same time, reducing lens element size and thus increasing picture resolution. Large viewing angles may also be used whilst retaining a high degree of perspective resolution. Both picture and perspective resolution may be increased without decreasing film grain size accordingly. This allows high quality autostereoscopic pictures (or prints) to be produced as well as providing an enlargement capability.

Black and white emulsion may be used to record colour images and the intermediate record may conveniently be used as the vehicle for a hologram at any scale factor of any subject which may be photographed and may have a more faithful representation of the latter's colour balance than can be achieved using conventional holographic techniques.

The particular arrangements as illustrated with reference to FIGS. 5 to 10 represent only some of a wide variety of embodiments of the present invention. For instance, whilst FIG. 7 represents a camera which produces an orthoscopic record in which the different colour components have been physically separated, it would be equally possible to produce pseudoscopic image as the intermediate stereoscopic record. In the first case the vertical axis of the apparatus illustrated with reference to FIG. 8 would be used to product an orthoscopic lenticular autostereoscopic picture. In the pseudoscopic case, the horizontal axis would be used.

In the embodiments illustrated the photosensitive surface of intermediate record and autostereoscopic picture have been shown to be flat. Embodiments in which the lenticulated screens and associated image bearing surfaces are curved are also possible. The apertures illustrated have been single slits and in the taking camera, rays from the object field, which would normally contain a three dimensional subject, are admitted, either simultaneously or over a short interval for any given object field. The method and apparatus of the invention can also be utilised in conjunction with components of, or associated with, a computer or other electronic device. By sequentially opening different elements of the aperture slit or moving a small aperture through the necessary distance, two dimensional information corresponding to various particular perspective views of a subject may be combined to form a composite stereoscopic record for subsequent production of an autostereoscopic picture. The two dimensional perspectives may be generated on a CRT or other electronic display device in the object field.

If the same principle is applied in apparatus which projects the record for viewing or reproduction, a particular perspective may be isolated and captured electronically on the face of an imaging device such as Vidicon. In fact, in such an application the different "perspectives" need not be genuine perspectives of an object field but may represent any form of visual two dimensional record.

Embodiments of the invention such as that described with reference to FIG. 7 provide an article which forms an intermediate record in producing an autostereoscopic picture. This would normally be in the form of a transplant film one side of which is spherically lenticulated and the other of which carries black and white or colour photographic emulsion. It is clear that the lens elements of the film may be composite being formed by two cylindrical lenticules placed orthogonally and in close proximity. Furthermore, the image bearing surface need not be in part of the same sheet and may involve a variety of photosensitive media or compounds.

The taking camera and the spherically lenticulated film may each be adapted for "rapid-access" or fast processing using principles similar to that of Polaroid Auto Process Film or the SX-70 process.

Although the lens elements of the intermediate article are illustrated to be portions of a sphere, other surfaces involving degrees of aspheric correction and/or astigmatism may be used.

Whilst transmitting lens components have been illustrated it is understood that convergent reflecting optics is frequently a practical alternative.

FIG. 8 illustrates a number of imaging components in relation to changes of scale and viewing position. Other arrangements are possible in which lens components are placed between record 64 and aperture 65. Furthermore, component 87 may also be used in front of the image formed at point 75.

In the embodiments described elongate aperture means have typically been generally rectangular. There will be occasions, however, when the long dimension of elongate means may be gently curved, for example to compensate for distortions in the imaging system. Also, in certain embodiments of the invention the width of the elongate means may vary along its length. This can be useful to counteract other variations in the optical efficiency of the system. A further variation of the elongate aperture means has its horizontal edges in one plane and its vertical edges in a different plane along the optical path.

Where spatial separation of colour components takes place, the colour balance may be variety as desired by, for example, the use of selected colour filters.

In the embodiment of FIG. 7, image components each comprising a different colour component of a recorded image are displaced in a direction orthogonal to the direction of perspective change. Although in this example the colour splitting component produces a continuous range of components, other embodiments can provide colour components which are distinct from each other. Whilst colour image components have been illustrated still further embodiments can provide components which represent the object field at different instants in time and again these may be formed as a continuous sequence or as a series of discrete exposures, as illustrated with respect to FIG. 5, which shows two such exposures. In FIG. 5 the aperture itself is moved but instead the array could be moved relative to the aperture. Alternatively, a virtual image of the aperture, as exists in the embodiment of FIG. 7, when viewed from the lens array in a direction fixed with respect to that array can be moved either by tipping the array or by a movement of reflecting means. In these examples where relative movement is effected, the real image of the aperture formed at the recording means is moved relative to the latter. This would also be achieved by moving the array itself relative to the aperture and/or the recording means.

A particular embodiment of the invention involves a modification of the spherically lenticulated film, and a specially adapted taking camera and reproduction system. The lenticulated surface is positioned much closer to the emulsion bearing surface than would normally follow from the requirement that the latter be near the focal plane of the lens elements (lenticules). The necessary optical path length between the two surfaces is achieved by allowing light focussed by each lens element to pass through the emulsion bearing surface between gaps in the emulsion, and subsequently, to be reflected at a precise distance away, back towards the emulsion. The latter is protected from exposure at the first pass of light through the structure by an absorbing or reflecting layer between it and the transparent lenticulated material. The emulsion is laid down in a striped pattern, the position of each strip corresponding to the image of the taking aperture formed by each lens element following reflection by a surface positioned at a known distance behind the film. Both the taking camera and the reproduction system accept the film in intimate contact with a transparent sheet of glass or other transparent hard wearing material, the rear surface of which is reflecting.

The efficiency of such a system depends on the fraction of the emulsion bearing surface which is left transparent. This in turn depends on the aspect ratio of the taking aperture and the extent to which the facility of extending the record length when compared to lenticule width has been utilised. If a configuration of lenticules and aperture length corresponding to the arrangement of FIG. 6 is used, but with an aspect ratio of 20:1 rather than a possible 10:1 for the taking aperture, then 50% of the emulsion bearing surface would receive a focussed image and therefore a 50% coverage of the surface by emulsion would suffice. The major advantage of such an arrangement is the reduction in the necessary thickness of the lenticulated film and its attendant ease of handling and lower material cost.

I claim:

1. A reproduction method for the production of an autostereoscopic image of an object field in which perspective change substantially in one direction only is reproduced, said image being produced from an intermediate record, said record comprising an array of lens elements extending in two dimensions, each lens element being convergent in all planes orthogonal to said array, and an array of images recorded on associated intermediate recording means, each recorded image being associated with a respective one of said lens elements, the reproduction method comprising, substantially uniformly illuminating at least a portion of said intermediate record, arranging elongate section aperture means to transmit only rays each of which has traversed a recorded image and its associated lens element and forming an image from said transmitted rays in which perspective change substantially in one direction only is reproduced.

2. A reproduction method as claimed in claim 1, wherein each lens element in said intermediate record comprises a spheroidal surface portion.

3. A record for the production of an autostereoscopic image of an object field in which substantially perspective change in one direction only is recorded, comprising an array of lens elements arranged in rows and columns and extending in two dimensions, which rows and columns define two co-ordinate axes, each lens element being convergent in all planes orthogonal to said array and recorded images associated with respective lens elements, each of said recorded images being distinct from other images associated with adjacent elements and derived from rays from a range of perspectives of the object field in one direction and a substantially smaller range of perspectives in an orthogonal direction.

4. A record as claimed in claim 3, wherein each element in the array comprises a spheroidal surface portion.

5. A record as claimed in claims 3 or 4 in which the length of the, or each, recorded image is substantially greater than the width of the associated lens element.

6. A record as claimed in claim 5, wherein the lens elements and respective recorded images are so arranged that for a recorded image, the Figure of Merit is greater than 8, the Figure of Merit being given by the expression $$N\left[\frac{\alpha}{2(\mu - 1)}\right]^{2.2}$$

where $\alpha$ is the viewing angle in radians in the direction of perspective change through a lens element, N is the number of distinct perspectives in the recorded image associated with said lens element, and $\mu$ is said element's effective refractive index.

7. A record as claimed in claim 6, wherein the Figure of Merit is greater than 14.

8. Reproduction apparatus for the production of an autostereoscopic image of an object field from a record as claimed in claim 3, comprising means for mounting said record, a light source arranged to provide substantially uniform illumination of at least a portion of said record, elongate selection aperture means arranged to transmit only rays from said light source each of which has traversed a recorded image and its associated lens element, and imaging means arranged to form an autostereoscopic image from said transmitted rays in which perspective change substantially in one direction only is reproduced.

9. Apparatus as claimed in claim 8, wherein the elongate selection aperture means is such that rays forming all perspectives of the autostereoscopic image are transmitted simultaneously.

10. Apparatus as claimed in claim 8, wherein the elongate selection aperture means comprises an aperture which transmits, at a given instant, rays forming only a portion of the range of perspectives of the autostereoscopic image, and means for effecting relative movement between said aperture and said rays whereby all rays from which the autostereoscopic image is formed are transmitted over a time interval.

11. Apparatus as claimed in claim 10, wherein said imaging means and said aperture are fixed relative one to the other.

12. Apparatus as claimed in claim 10, including means for mounting final recording means for recording said autostereoscopic image, said means for mounting final recording means and/or said means for mounting said intermediate record being rotatable during said time interval relative to said rays about an axis or axes normal to the direction of perspective change.

13. Apparatus as claimed in claim 8, wherein said light source is a movable compact source.

14. Apparatus as claimed in claim 8 for the production of an autostereoscopic image from a record in which the images formed on said record comprise colour components displaced relative to one another in a direction normal to the direction of perspective change, said apparatus including means for recombining said colour components to form said autostereoscopic image.

15. Apparatus as claimed in claim 8, wherein said imaging means is adapted for varying the scale of the autostereoscopic image.

16. Apparatus as claimed in claim 8, which is adapted for direct viewing of the autostereoscopic image.

17. Apparatus as claimed in claim 8, including final recording means for recording said autostereoscopic image.

18. Apparatus as claimed in claim 16, including a diffusing screen close to the autostereoscopic image which diffuses preferentially in the direction normal to the direction of perspective change.

19. Apparatus as claimed in claim 17, wherein said light source is coherent and said final recording means comprises a photosensitive surface and a coherent reference beam.

20. Apparatus as claimed in claim 17, wherein said final recording means comprises cylindrical lens elements with the longitudinal axes of the elements transverse to the direction of perspective change of the autostereoscopic image and a photosensitive surface on the side of the elements remote from the elongate selection aperture means and imaging means.

* * * * *